Dec. 29, 1942.  E. PAYNE  2,306,495
TIRE VALVE
Filed Dec. 20, 1941  2 Sheets-Sheet 1
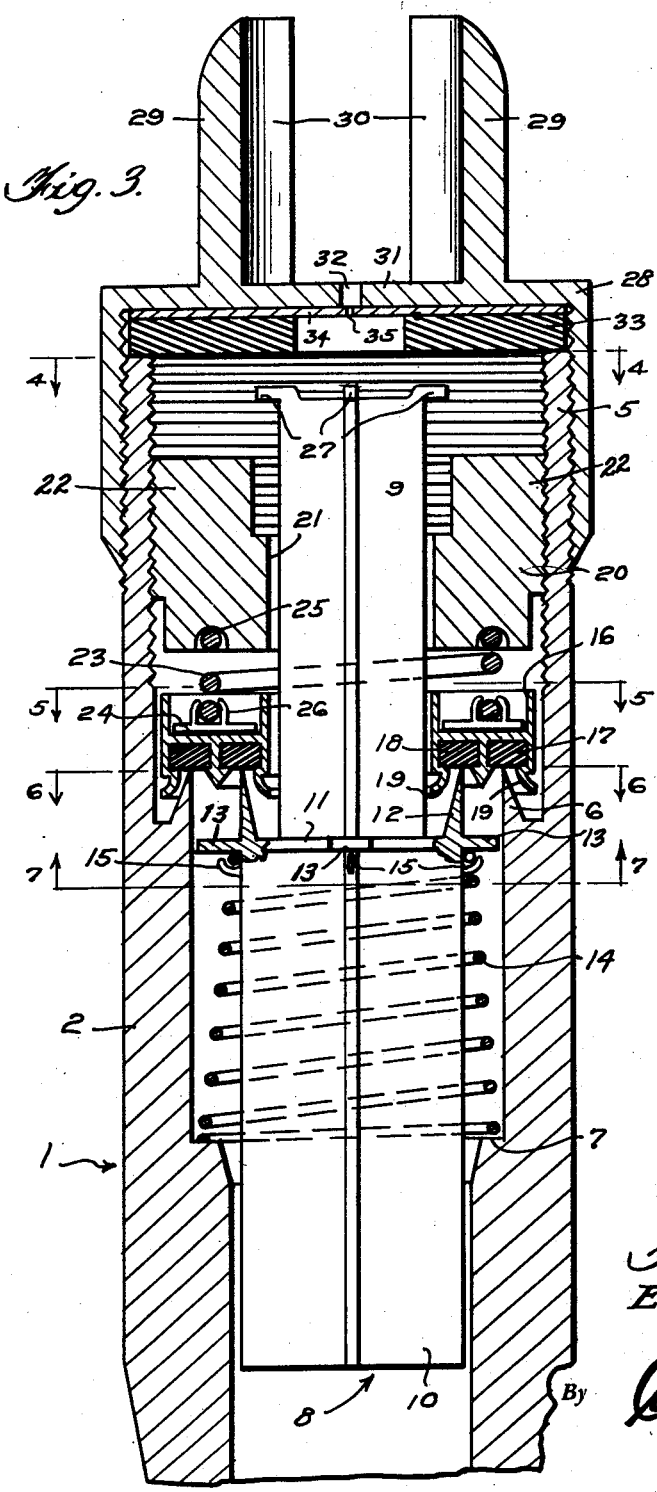
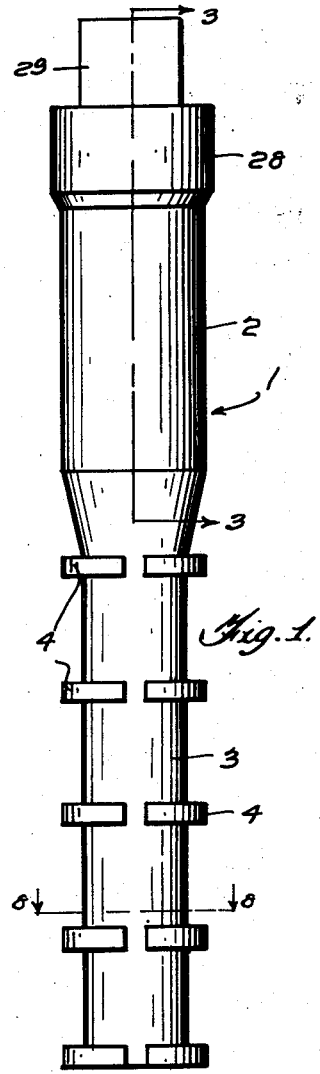
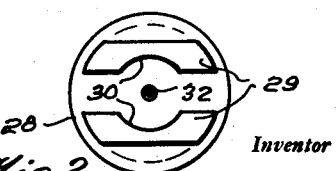
Inventor
ERNEST PAYNE
By Clarence A. O'Brien
Attorney Dec. 29, 1942.    E. PAYNE    2,306,495
TIRE VALVE
Filed Dec. 20, 1941    2 Sheets-Sheet 2

Inventor
ERNEST PAYNE

By Clarence A. O'Brien
Attorney

Patented Dec. 29, 1942

2,306,495

UNITED STATES PATENT OFFICE 2,306,495

TIRE VALVE

Ernest Payne, Repton, Ky.

Application December 20, 1941, Serial No. 423,839

1 Claim. (Cl. 137—69.5)

The present invention relates to new and useful improvements in inflating valves, particularly for pneumatic vehicle tires, and has for its primary object to provide, in a manner as hereinafter set forth, a device of this character which is adapted to automatically release the air to the atmosphere at a predetermined pressure, thereby preventing over-inflation, blow-outs, and materially promoting safety.

Another very important object of the invention is to provide an automatic safety valve of the aforementioned character which may be conveniently and accurately adjusted to release the air at any desired pressure.

Still another very important object of the invention is to provide a tire inflating valve of the character described wherein the air releasing means may readily be rendered inoperative, if desired.

Other objects of the invention are to provide an automatic safety tire inflating valve of the character set forth which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is an elevational view of a tire valve constructed in accordance with the present invention.

Figure 2 is a top plan view thereof.

Figure 3 is a fragmentary view in vertical section, taken substantially on the line 3—3 of Figure 1.

Figure 4:
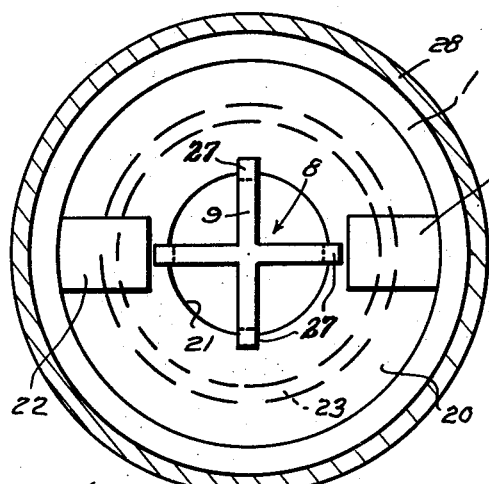
Figure 4 is a view in horizontal section, taken substantially on the line 4—4 of Figure 3.
Figure 5:
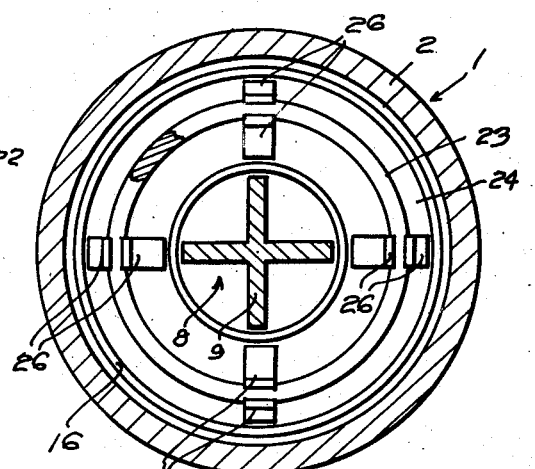
Figure 5 is a view in horizontal section through the device, taken substantially on the line 5—5 of Figure 3.
Figure 6:
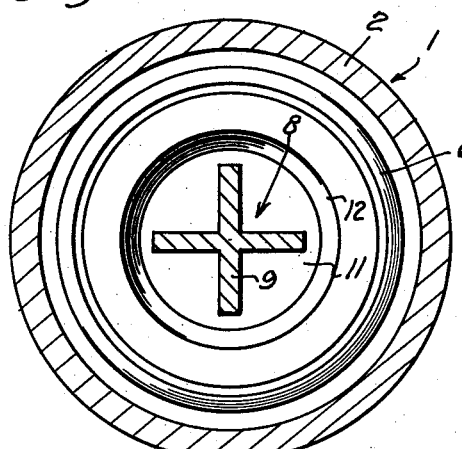
Figure 6 is a horizontal sectional view, taken substantially on the line 6—6 of Figure 3.
Figure 7:
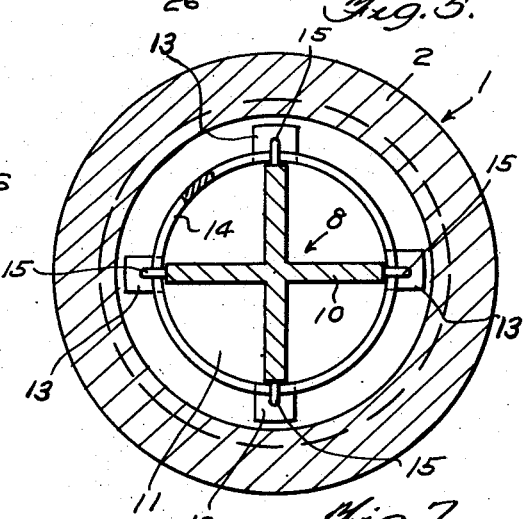
Figure 7 is a view in horizontal section, taken substantially on the line 7—7 of Figure 3.

Referring now to the drawings in detail, it will be seen that the embodiment of the invention which has been illustrated comprises a tubular casing of suitable length, diameter and material, which is designated generally by reference numeral 1. The tubular casing 1 includes comparatively large and small upper and lower portions 2 and 3, respectively. The portion 3 of the casing 1 is to be anchored in the inner tube (not shown) of the tire and toward this end has formed thereon a plurality of circumferentially extending segmental ribs 4.

The upper end portion of the casing 1 is internally and externally threaded, as at 5. At an intermediate point, the portion 2 of the casing 1 is internally reduced and formed to provide a seat 6. At a point in spaced relation below the seat 6, the portion 2 of the casing 1 is again internally reduced for providing a shoulder 7.

Mounted for reciprocation in the portion 2 of the casing 1 is a core which is designated generally by reference numeral 8, said core being substantially cross-shaped in horizontal section. The core 8 comprises comparatively small and large, integral upper and lower stems 9 and 10, respectively. On the upper end of the inner or lower stem 10 is an inflating valve member 11 in the form of a disc from which a beveled ring 12 rises. Lugs or ears 13 project from the periphery of the inflating valve member 11. A coil spring 14, which rests on the shoulder 7, is engaged beneath the ears 13 for yieldingly urging the inflating valve member 11 upwardly toward closed position. The spring 14 encircles the lower stem 10. Retaining fingers 15 project from the stem 10 and are bent over the upper end portion of the spring 14 for anchoring said spring to said stem.

Encircling the stem 9 and operable in the upper portion 2 of the tubular casing 1 is an annular channel member constituting a relief valve 16 having mounted in its lower portion a sealing ring 17 of rubber or other suitable material engageable on the seat 6.

Also mounted in the lower portion of the relief valve 16, inwardly of the sealing element 17 and concentric therewith, is an annular, resilient seat 18 of rubber or other suitable material with which the element 12 of the inflating valve member 11 is engageable. Guides 19 assure proper engagement of the elements 6, 17, 12 and 18.

Threadedly mounted for adjustment in the upper portion 5 of the tubular casing 1 is a plug 20 having a central opening 21 therein which accommodates the stem 9. Rising from the plug 20 is a pair of lugs 22. Mounted between the plug 20 and the relief valve member 16 is a coil spring 23 which encircles the stem 9. The lower end of the coil spring 23 rests on a flat ring 24 in the relief valve member 16. Fingers 26 secure the spring 23 to the ring 24. An annular groove or channel 25 in the lower end of the plug 20 accommodates the upper end of the spring 23. It will thus be seen that the relief valve member 16 is yieldingly urged downwardly on the seat 6. Lugs 27 project from the upper end of the stem 9 for preventing separation of the core 8 and the elements thereon from the plug 20 after the valve has been assembled.

Threaded on the upper end portion 2 of the tubular casing 1 is a removable cap 28. The cap 28 has rising therefrom a pair of spaced jaws 29 which are adapted to receive the lugs 22 therebetween for inserting, removing or adjusting the plug 20. The opposed faces of the jaws 29 are shaped, as at 30, to clear the upper portion of the stem 9 when said jaws are inserted in the tubular casing 1.

The top 31 of the cap has formed therein a centrally located opening 32. Secured in the cap 28 beneath the top 31 by a gasket 33 is a disc 34 of suitable material. The disc 34 has formed therein a small air vent 35 which communicates with the opening 32.

It is thought that the operation of the device will be readily apparent from a consideration of the foregoing. Briefly, an air hose is engaged in the usual manner with the upper end of the casing 1, after the cap 28 has been removed, and the core 8 is depressed against the tension of the coil spring, thus opening the inflating valve member 11 by disengaging the portion 12 thereof from the seat 18. While this is being done, the sealing member 17 of the relief valve 16 is maintained in closed position on the seat 6 by the coil spring 23. When the inflating valve member 11 is thus opened, air from the source of supply is free to flow through the casing 1 around the core 8 to the tire. When the core 8 is released the valve member 11 is immediately closed on the seat 18 by the coil spring 14. If the pressure of the air in the tire is sufficient to overcome the tension of the spring 23, the relief valve member 16 is raised from the seat 6 thereby permitting the escape of the air from the tire to the atmosphere, said air passing or flowing around the relief valve member 16, through the passage 21 in the plug 20 and escaping through the vents 35 and 32. The tension of the coil spring 23 may be regulated to release the air from the tire at any desired pressure by simply adjusting the plug 20 in the casing 1. By screwing the plug 20 down hard, the relief valve 16 may, if desired, be held in closed position on the seat 6 at all times. Or, the relief valve may be rendered inoperative by placing an imperforate disc in the cap 28. Should the plug 20 be removed, the lugs 27 on the stem 9 engaged thereon for picking up and lifting the entire assembly out of the casing 1.

Figure 9:
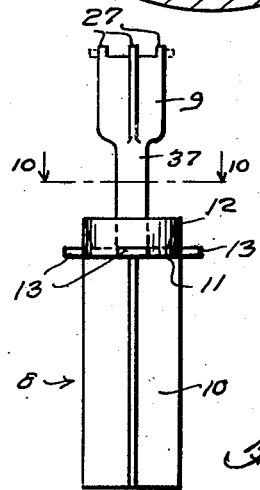
Figure 9 is a detail view in elevation, showing a slight modification.
Figure 10:
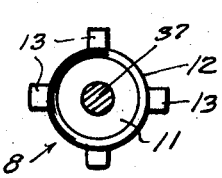
Figure 10 is a view in horizontal section, taken substantially on the line 10—10 of Figure 9.
Figure 8:
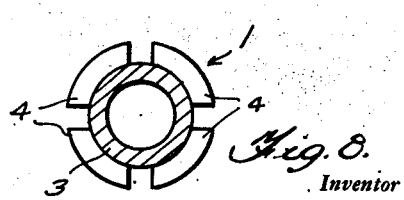
Figure 8 is a view in horizontal section, taken substantially on the line 8—8 of Figure 2.

In the modification illustrated in Figures 9 and 10 of the drawings, the lower portion of the stem 9 is in the form of a rod 37 which rises from the inflating valve member 11. In other respects, this form of the invention is substantially similar in construction and operation to the embodiment illustrated in Figures 1 to 8, inclusive, of the drawings. The lugs 27 are shown, in full lines in Figure 9, in vertical position to permit the insertion of the stem 9 through the plug 20, after which said lugs are bent outwardly to the dotted line position.

It is believed that the many advantages of an automatic safety tire valve constructed in accordance with the present invention will be readily understood, and although preferred embodiments of the device are as illustrated and described, it is to be understood that further modifications and changes in the details of construction may be resorted to which will fall within the scope of the invention as claimed.

What is claimed is:

A tire valve comprising a tubular casing, a stationary seat in said casing at an intermediate point, an annular shoulder in the casing, a relief valve member operable in the casing and including an annular channel, said relief valve member further including an annular sealing element beneath the channel engageable with the stationary seat, a spring in the casing engaged in the annular channel of the relief valve member for yieldingly urging same into engagement with the stationary seat, a seat in the valve member beneath the channel concentric with the sealing element, a stem mounted for reciprocation in the casing and extending through the annular channel, an inflating valve member on the stem at an intermediate point, said inflating valve member including a disc and a ring on the disc engageable with the seat in the valve member, lugs projecting from the periphery of the disc, and a coil spring in the casing having one end engaged with the shoulder and its other end engaged with said lugs for yieldingly urging the inflating valve member toward closed position.

ERNEST PAYNE.